(12) United States Patent
Oh et al.

(10) Patent No.: US 11,682,522 B2
(45) Date of Patent: Jun. 20, 2023

(54) CONDUCTIVE PASTE COMPOSITION FOR EXTERNAL ELECTRODE OF MULTILAYER CERAMIC CAPACITOR

(71) Applicant: SAMHWA CAPACITOR CO., LTD., Yongin-si (KR)

(72) Inventors: Young Joo Oh, Seoul (KR); Jung Rag Yoon, Goseong-gun (KR); In Hee Cho, Anseong-si (KR)

(73) Assignee: SAMHWA CAPACITOR CO., LTD., Yongin-si (KR)

(*) Notice: Subject to any disclaimer, the term of this patent is extended or adjusted under 35 U.S.C. 154(b) by 148 days.

(21) Appl. No.: 17/407,846

(22) Filed: Aug. 20, 2021

(65) Prior Publication Data

US 2022/0406524 A1    Dec. 22, 2022

(30) Foreign Application Priority Data

Jun. 22, 2021  (KR) .......................... 10-2021-0080804

(51) Int. Cl.
*H01G 4/008* (2006.01)
*H01G 4/012* (2006.01)
*H01G 4/30* (2006.01)

(52) U.S. Cl.
CPC .............. *H01G 4/008* (2013.01); *H01G 4/012* (2013.01); *H01G 4/30* (2013.01)

(58) Field of Classification Search
CPC ........... H01G 4/008; H01G 4/012; H01G 4/30
See application file for complete search history.

(56) References Cited

U.S. PATENT DOCUMENTS

| | | | |
|---|---|---|---|
| 5,877,934 A | 3/1999 | Sano et al. | |
| 2010/0294353 A1* | 11/2010 | Takahashi | ................ H01B 1/24 257/E31.124 |
| 2010/0328844 A1* | 12/2010 | Nishimura | ............ C04B 35/462 361/321.5 |
| 2012/0171810 A1* | 7/2012 | Park | ......................... C03C 8/22 252/514 |

(Continued)

FOREIGN PATENT DOCUMENTS

KR          101767536          8/2017

*Primary Examiner* — Michael P McFadden
(74) *Attorney, Agent, or Firm* — Cantor Colburn LLP (57) ABSTRACT

Provided is a conductive paste composition for an external electrode of a multilayer ceramic capacitor that includes a conductive base material, an organic solvent, a binder resin, and a dispersing agent. The conductive base material includes a flake-shaped conductive powder, a spherical conductive powder, and first and second glass frits. The flake-shaped conductive powder has a larger size $D_{50}$ than the spherical conductive powder. The first glass frit includes $SiO_2$, $SrCO_3$, $BaCO_3$, $Li_2SO_4$, $K_2SO_4$, $V_2O_5$, ZnO, $Al_2O_3$, and $Y_2O_3$, and the second glass frit includes $SiO_2$, $SrCO_3$, $BaCO_3$, CaF, ZnO, $Al_2O_3$, $Y_2O_3$, and $L_2O_3$.

11 Claims, 1 Drawing Sheet

(56) References Cited

U.S. PATENT DOCUMENTS

| | | | | |
|---|---|---|---|---|
| 2012/0174978 A1* | 7/2012 | Ionkin | .................... | C09D 5/24 |
| | | | | 977/773 |
| 2014/0233147 A1* | 8/2014 | Hong | .................... | H01G 4/008 |
| | | | | 361/301.4 |
| 2015/0022940 A1* | 1/2015 | Han | .................... | H01G 4/30 |
| | | | | 252/514 |
| 2015/0279566 A1* | 10/2015 | Otani | .................... | H01G 4/008 |
| | | | | 361/301.4 |
| 2015/0279570 A1* | 10/2015 | Koga | .................... | H01G 4/248 |
| | | | | 29/25.42 |
| 2020/0185153 A1* | 6/2020 | Yun | .................... | H01G 4/012 |

* cited by examiner

CONDUCTIVE PASTE COMPOSITION FOR EXTERNAL ELECTRODE OF MULTILAYER CERAMIC CAPACITOR

BACKGROUND OF THE INVENTION

1. Technical Field

The present invention relates to a conductive paste composition for an external electrode of a multilayer ceramic capacitor, and particularly to a conductive paste composition for an external electrode of a multilayer ceramic capacitor that adopts a combination of particle shapes or powder sizes of conductive powders in forming a conductive layer for the external electrode of a multilayer ceramic capacitor having an internal electrode formed of nickel (Ni) to improve density and uses two different types of glass frit to improve shrinkage or contact properties and an anti-oxidation agent as an additive to increase oxidation resistance.

2. Description of the Related Art

A technology related to a fabrication method for multilayer ceramic capacitors (MLCCs) is disclosed in Korean Patent No. 10-1767536 (Patent Document 1).

Patent Document 1 describes a method for fabricating a multilayer ceramic capacitor that includes forming a ceramic sintered body which is barrel-polished and includes a plurality of dielectric layers and a plurality of internal electrode layers formed on the individual dielectric layers to expose either one of both ends thereof; forming an external electrode connected to the internal electrode layers formed to expose either one of both ends thereof while surrounding both ends of the ceramic sintered body; applying a resin layer on the exposed part of the front surface of the ceramic sintered body; forming a plating layer on the surface of the external electrode by using a wet barrel plating method; and vacuum-drying the ceramic sintered body completed by the wet barrel-plating process.

The trend in the conventional multilayer ceramic capacitors (MLCCs) manufactured as in the Patent Document 1 has been toward ultra-small size and ultra-high capacitance. MLCCs are manufactured with very thin dielectric layers or internal electrode layers for ultra-small size and a lamination of a large number of dielectric layers for ultra-high capacitance. Further, the external electrode is fabricated by forming a conductive layer, a nickel layer, and a tin layer in order on the mounting surface of the ceramic sintered body, that is, the ceramic main body. Yet, when the conductive layer is formed with a low density, the plating solution possibly penetrates the conductive layer during the formation of the nickel or tin layer, which leads to a risk of reducing reliability in moisture resistance and high-temperature load.

PRIOR ART DOCUMENT

[Patent Document](Patent Document 1): Korean Patent No. 10-1767536

SUMMARY OF THE INVENTION

For solving the problems with the prior art, it is an object of the present invention to provide a conductive paste composition for an external electrode of a multilayer ceramic capacitor that adopts a combination of particle shapes or powder sizes of conductive powders in forming a conductive layer for the external electrode of a multilayer ceramic capacitor having an internal electrode formed of nickel (Ni) to improve density and uses two different types of glass frit to improve shrinkage or contact properties and an anti-oxidation agent as an additive to increase oxidation resistance.

It is another object of the present invention to provide a conductive paste composition for an external electrode of a multilayer ceramic capacitor that adopts a combination of particle shapes or powder sizes of the conductive powder, uses two different types of glass frit and an anti-oxidation agent as an additive in forming a conductive layer to improve the density and adhesion of the conductive layer of the external electrode and inhibit penetration of the plating solution, and secures its applicability to high capacitance by adopting sintering at low temperatures, which prevents deterioration of reliability associated with mechanical strengths or moisture resistance through occurrence of cracks, which is normally caused when using Cu for the conductive powder and Ni for the internal electrode layer in such a manner that Cu particles diffuse throughout the internal electrode layer due to formation of an alloy by the reaction between Cu and Ni of the internal electrode and the difference in diffusion rate between Cu and Ni to expand the volume of the internal electrode layer and thereby increase the stress in a dielectric substance, leading to cracks.

To achieve the objects of the present invention, there is provided a conductive paste composition for an external electrode of a multilayer ceramic capacitor that includes a conductive base material, an organic solvent, a binder resin, and a dispersing agent. The conductive base material includes a flake-shaped conductive powder, a spherical conductive powder, and first and second glass frits. The flake-shaped conductive powder has a larger size $D_{50}$ than the spherical conductive powder. The first glass frit includes $SiO_2$, $SrCO_3$, $BaCO_3$, $Li_2SO_4$, $K_2SO_4$, $V_2O_5$, $ZnO$, $Al_2O_3$, and $Y_2O_3$, and the second glass frit includes $SiO_2$, $SrCO_3$, $BaCO_3$, $CaF$, $ZnO$, $Al_2O_3$, $Y_2O_3$, and $L_2O_3$.

Advantageously, the conductive paste composition for an external electrode of a multilayer ceramic capacitor according to the present invention is advantageous in that it adopts a combination of particle shapes or powder sizes of the conductive powder in forming a conductive layer for the external electrode of a multilayer ceramic capacitor having an internal electrode formed of nickel (Ni) to improve density and uses two different types of glass frit to improve shrinkage or contact properties and an anti-oxidation agent as an additive to increase oxidation resistance.

The present invention is also advantageous in that it adopts a combination of particle shapes or powder sizes of the conductive powder, uses two different types of glass frit and an anti-oxidation agent as an additive in forming a conductive layer to improve the density and adhesion of the conductive layer of the external electrode and inhibit penetration of the plating solution, and secures its applicability to high capacitance by using sintering at low temperatures, which prevents deterioration of reliability associated with mechanical strengths or moisture resistance through occurrence of cracks, which is normal ly caused when using Cu for the conductive powder and Ni for the internal electrode layer in such a manner that Cu particles diffuse throughout the internal electrode layer due to formation of an alloy by the reaction between Cu and Ni of the internal electrode and the difference in diffusion rate between Cu and Ni to expand the volume of the internal electrode layer and thereby increase the stress in a dielectric substance, leading to cracks.

DETAILED DESCRIPTION

Hereinafter, a description will be given as to the embodiments of the conductive paste composition for an external electrode of a multilayer ceramic capacitor according to the present invention with reference to the accompanying drawing.

The conductive paste composition for anexternal electrode of a multilayer ceramic capacitor according to the present invention is comprised of a conductive base material, an organic solvent, a binder resin, and a dispersing agent.

The conductive base material includes a flake-shaped conductive powder, a spherical conductive powder, and first and second glass frits. The flake-shaped conductive powder has a larger size $D_{50}$ than the spherical conductive powder. The first glass frit includes $SiO_2$, $SrCO_3$, $BaCO_3$, $Li_2SO_4$, $K_2SO_4$, $V_2O_5$, ZnO, $Al_2O_3$, and $Y_2O_3$, and the second glass frit includes $SiO_2$, $SrCO_3$, $BaCO_3$, CaF, ZnO, $Al_2O_3$, $Y_2O_3$, and $L_2O_3$.

The flake-shaped conductive powder and the spherical conductive powder are formed of Cu. The flake-shaped conductive powder has a size $D_{50}$ of 2.0 to 4.0 μm, and the spherical conductive powder has a size $D_{50}$ of 0.3 to 1.5 μm.

The conductive base material includes14 to 68 wt. % of the flake-shaped conductive powder, 28 to 74 wt. % of the spherical conductive powder, 1 to 4 wt. % of the first glass frit, and 3 to 8 wt. % of the second glass frit.

The first glass frit includes20 to 40 wt. % of $SiO_2$, 15 to 17 wt. % of $SrCO_3$, 18 to 20 wt. % of $BaCO_{3,7}$ to 9 wt. % of $Li_2SO_4$, 7 to 9 wt. % of $K_2SO_4$, 7 to 10 wt. % of $V_2O_5$, 4 to 8 wt. % of ZnO, 2 to 4 wt. % of $Al_2O_3$, and 0 to 3 wt. % of $Y_2O_3$. The second glass frit includes40 to 56 wt. % of BaCOs, 7 to 9 wt. % of $SiO_2$, 7 to 9 wt. % of $SrCO_{3,8}$ to 10 wt. % of CaF, 20 to 23 wt. % of ZnO, 2 to 5 wt. % of $Al_2O_3$, 0 to 2 wt. % of $L_2O_3$, and 0 to 2 wt. % of $Y_2O_3$.

The first glass frit has a smaller powder size $D_{50}$ than the second glass frit. The first glass fr it has a powder size $D_{50}$ of 0.3 to 1.5 μm, and the second glass frit has a powder size $D_{50}$ of 2 to 4.0 μm.

The organic solvent is any one selected from the group consisting of carbitol, terpineol, hexyl carbitol, taxanol, butyl carbitol, butyl carbitol acetate, dimethyl adipate, dihydroterpinyl actate, and isobornyl acetate. The binder resin is an acryl-based binder. The acryl-based binder is at least one selected from the group consisting of tyrene-(meth)acrylic acid ester copolymer, acrylic acid-butyl acrylate copolymer, and methyl methacrylate. With this, it is possible to improve the adhesion between a sintered body 10 and the conductive paste composition of the present invention. The dispersing agent is at least one selected from the group consisting of carboxylic acid, stearic acid, oleic acid, and oleoyl sarcosine.

The conductive paste composition is formed by mixing 70 to 81 wt. % of the conductive base material, 10 to 15 wt. % of the organic solvent, 6 to 10 wt. % of the binder resin, and 3 to 5 wt. % of the dispersing agent.

Examples and Comparative Examples were prepared as given by Table 1 for the testing on the conductive paste composition for an external electrode of a multilayer ceramic capacitor according to the present invention.

TABLE 1

|  | Flake-shaped metal powder (wt %) | | Spherical metal powder (wt. %) | | | First glass frit wt % | Second glass frit wt % |
| --- | --- | --- | --- | --- | --- | --- | --- |
|  | FD1 | FD2 | FD1 | FD2 | SD3 | (SK1~SK4) | (BC1~BC5) |
| Comparative Example 1 | 0 | 0 | 96 | 0 | 0 | 4(SK2) | 0 |
| Comparative Example 2 | 0 | 0 | 0 | 97 | 0 | 0 | 3(BC3) |
| Comparative Example 3 | 0 | 0 | 0 | 0 | 98 | 2(SK1) | 0 |
| Comparative Example 4 | 96 | 0 | 0 | 0 | 0 | 4(SK3) | 0 |
| Comparative Example 5 | 97 | 0 | 0 | 0 | 0 | 0 | 3(BC2) |
| Comparative Example 6 | 0 | 92 | 0 | 0 | 0 | 0 | 8(BC1) |
| Comparative Example 7 | 44 | 54 | 0 | 0 | 0 | 0 | 2(BC1) |
| Comparative Example 8 | 65 | 32 | 0 | 0 | 0 | 0 | 3(BC3) |
| Comparative Example 9 | 0 | 0 | 66 | 24 | 00 | 5(SK1) | 0 |
| Comparative Example 10 | 0 | 0 | 0 | 79 | 14 | 4(SK2) | 0 |
| Comparative Example 11 | 0 | 81 | 0 | 15 | 0 | 4(SK2) | 0 |
| Comparative Example 12 | 81 | 0 | 0 | 0 | 15 | 0 | 4(BC1) |
| Comparative Example 13 | 0 | 24 | 0 | 72 | 0 | 4(SK4) | 0 |
| Comparative Example 14 | 0 | 39 | 0 | 58 | 0 | 0 | 3(BC2) |

TABLE 1-continued

|  | Flake-shaped metal powder (wt %) | | Spherical metal powder (wt. %) | | | First glass frit wt % | Second glass frit wt % |
| --- | --- | --- | --- | --- | --- | --- | --- |
|  | FD1 | FD2 | FD1 | FD2 | SD3 | (SK1~SK4) | (BC1~BC5) |
| Comparative Example 15 | 34 | 0 | 64 | 0 | 0 | 0 | 2(BC5) |
| Comparative Example 16 | 24 | 0 | 0 | 0 | 70 | 0 | 6(BC5) |
| Comparative Example 17 | 0 | 16 | 0 | 0 | 80 | 0 | 4(BC2) |
| Example 1 | 38 | 16 | 8 | 20 | 14 | 4(SK3) | 4(BC5) |
| Example 2 | 30 | 16 | 10 | 21 | 15 | 2(SK4) | 6(BC2) |
| Example 3 | 30 | 16 | 10 | 23 | 15 | 1(SK4) | 5(BC3) |
| Example 4 | 25 | 18 | 11 | 23 | 17 | 2(SK1) | 4(BC5) |
| Example 5 | 22 | 19 | 11 | 23 | 17 | 2(SK4) | 6(BC3) |
| Example 6 | 23 | 19 | 12 | 24 | 18 | 1(SK3) | 3(BC4) |
| Example 7 | 20 | 19 | 12 | 24 | 18 | 2(SK2) | 5(BC2) |
| Example 8 | 15 | 20 | 13 | 26 | 20 | 2(SK3) | 4(BC1) |
| Example 9 | 15 | 20 | 13 | 26 | 20 | 3(SK1) | 3(BC2) |
| Example 10 | 14 | 20 | 14 | 26 | 20 | 2(SK2) | 4(BC5) |
| Example 11 | 8 | 20 | 14 | 28 | 20 | 4(SK2) | 6(BC1) |

The conductive paste compositions for an external electrode of a multilayer ceramic capacitor according to the present invention were prepared using a conductive base material, an organic solvent, a binder resin, and a dispersing agent. As shown in Table 1, each conductive base material according to Examples 1 to 11 of the present invention was prepared using 8 to 38 wt. % of a first sized flake-shaped conductive powder FD1, 16 to 20 wt. % of a second sized flake-shaped conductive powder FD2, 8 to 14 wt. % of a first sized spherical conductive powder SD1, 20 to 28 wt. % of a second sized spherical conductive powder SD2, 14 to 20 wt. % of a third sized spherical conductive powder SD3, 1 to 4 wt. % of a first glass frit, and 3 to 6 wt. % of a second glass frit.

The first sized flake-shaped conductive powder FD1, the second sized flake-shaped conductive powder FD2, the first sized spherical conductive powder SD1, the second sized spherical conductive powder SD2, and the third sized spherical conductive powder SD3 used for preparation of the conductive base material were of different sizes $D_{50}$. That is, the first sized flake-shaped conductive powder FD1 and the second sized flake-shaped conductive powder FD2 of different sizes $D_{50}$ were used for the flake-shaped conductive powder. Further, the first sized spherical conductive powder SD1, the second sized spherical conductive powder SD2 and the third sized spherical conductive powder SD3 of different sizes $D_{50}$ were used for the spherical conductive powder having a smaller size $D_{50}$ than the flake-shaped conductive powder. In other words, the first sized flake-shaped conductive powder FD1 had a smaller size $D_{50}$ than the second sized flake-shaped conductive powder FD2; and the second sized flake-shaped conductive powder FD2 had a smaller size $D_{50}$ than the third sized spherical conductive powder SD3. The first sized spherical conductive powder SD1 had a smaller size $D_{50}$ than the second sized spherical conductive powder SD2; the second sized spherical conductive powder SD2 had a smaller size $D_{50}$ than the third sized spherical conductive powder SD3; and the third sized spherical conductive powder SD3 had a smaller size $D_{50}$ than the first sized flake-shaped conductive powder FD1. For example, the first sized spherical conductive powder SD1 had a smaller size $D_{50}$ than the second sized spherical conductive powder SD2; the size $D_{50}$ of the second sized spherical conductive powder SD2 was smaller than that of the third sized spherical conductive powder SD3 and larger than that of the first sized spherical conductive powder SD1; and the third sized spherical conductive powder SD3 had a smaller size $D_{50}$ than the first sized flake-shaped conductive powder FD1. For example, the first sized flake-shaped conductive powder FD1 had a size $D_{50}$ of 2.0 μm; the second sized flake-shaped conductive powder FD2 had a size $D_{50}$ of 4.0 μm; the first sized spherical conductive powder SD1 had a size $D_{50}$ of 0.3 μm; the second sized spherical conductive powder SD2 had a size $D_{50}$ of 0.6 μm; and the third sized spherical conductive powder SD3 had a size $D_{50}$ of 1.5 μm. With this, it was possible to improve the density of the conductive layer 21 (shown in FIG. 1) of the external electrode 20 (in FIG. 1).

The first glass frit was prepared, as presented in Table 1, using any one selected from the group consisting of a first $SiO_2$-$SrCO_3$-$BaCO_3$-$Li_2SO_4$-$K_2SO_4$-based glass frit SKI, a second $SiO_2$-$SrCO_3$-$BaCO_3$-$Li_2SO_4$-$K_2SO_4$-based glass frit SK2, a third $SiO_2$-$SrCO_3$-$BaCO_3$-$Li_2SO_4$-$K_2SO_4$-based glass frit SK3, and a fourth $SiO_2$-$SrCO_3$-$BaCO_3$-$Li_2SO_4$-$K_2SO_4$-based glass frit SK4. Each of the first to fourth $SiO_2$-$SrCO_3$-$BaCO_3$-$Li_2SO_4$-$K_2SO_4$-based glass frits SKi, SK2, SK3, and SK4 included at least eight selected from the group consisting of $SiO_2$, SrCOs, BaCOs, $Li_2SO_4$, $K_2SO_4$, $V_2O_5$, ZnO, $Al_2O_3$, and $Y_2O_3$.

The first to fourth $SiO_2$-SrCOs-$BaCO_3$-$Li_2SO_4$-$K_2SO_4$-based glass frits SKI, SK2, SK3, and SK4 as listed in Table 1 were of different powder sizes $D_{50}$. For example, the first $SiO_2$-$SrCO_3$-$BaCO_3$-$Li_2SO_4$-$K_2SO_4$-based glass frit SK1 had a powder size $D_{50}$ of 0.3 μm; the second $SiO_2$-SrCOs-BaCOs-$Li_2SO_4$-$K_2SO_4$-based glass frit SK2 had a powder size $D_{50}$ of 0.7 μm; the third $SiO_2$-$SrCO_3$-$BaCO_3$-$Li_2SO_4$-$K_2SO_4$-based glass frit SK3 had a powder size $D_{50}$ of 1.0 μm; and the fourth $SiO_2$-$SrCO_3$-$BaCO_3$-$Li_2SO_4$-$K_2SO_4$-based glass frit SK4 had a powder size $D_{50}$ of 1.5 μm. Using these glass frits of different powder sizes $D_5a$, it was possible to improve the density of the conductive layer 21 (shown in FIG. 1) of the external electrode 20 (in FIG. 1).

The second glass frit was prepared, as presented in Table 1, using any one selected from the group consisting of a first BaCOs-$SiO_2$-$SrCO_3$-CaF-based glass frit BC1, a second $BaCO_3$-$SiO_2$-$SrCO_3$-CaF-based glass frit BC2, a third $BaCO_3$-$SiO_2$-$SrCO_3$-CaF-based glass frit BC3, a fourth $BaCO_3$-$SiO_2$-$SrCO_3$-CaF-based glass frit BC4, and a fifth BaCOs-SiO$_2$-SrCOs-CaF-based glass frit BC5. Each of the first to fifth BaCO$_3$-SiO$_2$-SrCO$_3$-CaF-based glass frits BC1, BC2, BC3, BC4, and BC5 included at least six selected from the group consisting of BaCOs, SiO$_2$, SrCOs, CaF, ZnO, Al$_2$O$_3$, Y$_2$O$_3$, and L$_2$O$_3$.

Figure 1:
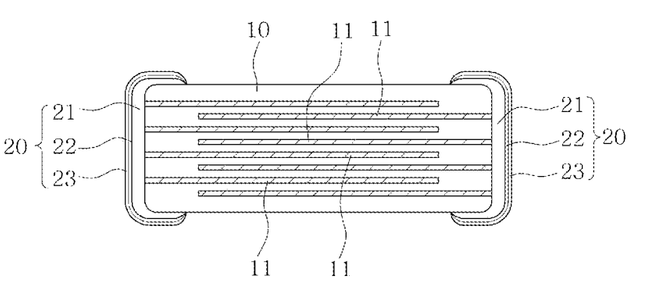
FIG. 1 is across-sectional view of a multilayer ceramic capacitor with a conductive layer using the conductive paste composition for an external electrode of a multilayer ceramic capacitor according to the present invention.

The first to fifth BaCO$_3$-SiO$_2$-SrCO$_3$-CaF-based glass frits BC1, BC2, BC3, BC4, and BC5 were of different powder sizes D$_{50}$. The first to fifth BaCOs-SiO$_2$-SrCOs-CaF-based glass frits BC1, BC2, BC3, BC4, and BC5 had larger powder sizes D$_{50}$ than the first to fourth first to fourth SiO$_2$-SrCO$_3$-BaCO$_3$-Li$_2$SO$_4$-K$_2$SO$_4$-based glass frits SKi, SK2, SK3, and SK4. For example, the first BaCO$_3$-SiO$_2$-SrCO$_3$-CaF-based glass frit BC1 had a powder size D$_{50}$ of 2.0 µm; the second BaCO$_3$-SiO$_2$-SrCO$_3$-CaF-based glass frit BC2 had a powder size D$_{50}$ of 2.5 µm; the third BaCO$_3$-SiO$_2$-SrCO$_3$-CaF-based glass frit BC3 had a powder size D$_{50}$ of 3.0 µm; the fourth BaCO$_3$-SiO$_2$-SrCO$_3$-CaF-based glass frit BC4 had a powder size D$_{50}$ of 3.5 µm; and the fifth BaCO$_3$-SiO$_2$-SrCO$_3$-CaF-based glass frit BC5 had a powder size D$_{50}$ of 4.0 µm. Using these glass frits of different powder sizes D$_5$a, it was possible to improve the density of the conductive layer 21 of the external electrode 20.

Hereinafter, reference will be made to Table 1 to describe Examples 1 to 11, which are the specific embodiments of the conductive base material applied to the conductive paste composition for an external electrode of a multilayer ceramic capacitor according to the present invention.

As presented in Table 1, the conductive base material according to Example 1 was prepared using38 wt. % of the first sized flake-shaped conductive powder FD1, 16 wt. % of the second sized flake-shaped conductive powder FD2, 8 wt. % of the first sized spherical conductive powder SD1, 20 wt. % of the second sized spherical conductive powder SD2, 14 wt. % of the third sized spherical conductive powder SD3, 4 wt. % of the first glass frit, and 4 wt. % of the second glass frit.

Since the sizes D$_{50}$ of the first sized flake-shaped conductive powder FD1, the second sized flake-shaped conductive powder FD2, the first sized spherical conductive powder SD1, the second sized spherical conductive powder SD2, and the third sized spherical conductive powder SD3 used in Example 1 are the same as described above, a description thereof will be omitted. In Example 1, the first glass frit was the third SiO$_2$-SrCO$_3$-BaCO$_3$-Li$_2$SO$_4$-K$_2$SO$_4$-based glass frit SK3 having a powder size D$_{50}$ of 1.0 µm; and the second glass frit was the fifth BaCO$_3$-SiO$_2$-SrCO$_3$-CaF-based glass fr it BC5 having a powder size D$_{50}$ of 4.0 µm. As presented in Table 2, conductive base materials of Examples 2 to 10 were prepared in the same manner as described in Example 1. A conductive base material of Example 11 was prepared using8 wt. % of the first sized flake-shaped conductive powder FD1, 20 wt. % of the second sized flake-shaped conductive powder FD2, 14 wt. % of the first sized spherical conductive powder SD1, 28 wt. % of the second sized spherical conductive powder SD2, 20 wt. % of the third sized spherical conductive powder SD3, 4 wt. % of the first glass frit, and 6 wt. % of the second glass frit. Since the sizes D$_{50}$ of the first sized flake-shaped conductive powder FD1, the second sized flake-shaped conductive powder FD2, the first sized spherical conductive powder SD1, the second sized spherical conductive powder SD2, and the third sized spherical conductive powder SD3 used in Example 11 are the same as described above, a description thereof will be omitted. In Example 11, the first glass frit was the second SiO$_2$-SrCO$_3$-BaCO$_3$-Li$_2$SO$_4$-K$_2$SO$_4$-based glass frit SK2 having a powder size D$_{50}$ of 0.7 µm; and the second frit was the first BaCO$_3$-SiO$_2$-SrCO$_3$-CaF-based glass frit BC1 having a powder size D$_{50}$ of 2.0 µm.

For a comparison with the conductive base materials of Examples 1 to 11, the conductive base materials according to Comparative Examples 1 to 17 were prepared as given in Table 1. The conductive base material of Comparative Example 1 was prepared using96 wt. % of the first sized spherical conductive powder SD1 and 4 wt. % of the first glass frit. In Comparative Example 1, the first sized spherical conductive powder SD1 had a powder size D$_{50}$ of 0.3 µm; and the first glass frit was the second SiO$_2$-SrCO$_3$-BaCO$_3$-Li$_2$SO$_4$-K$_2$SO$_4$-based glass frit SK2 having a powder size D$_{50}$ of 0.3 µm. Like the conductive base material of Comparative Example 1, the conductive base materials of Comparative Examples 2 to 17 were prepared using either one of the first sized flake-shaped conductive powder FD1 or the second sized flake-shaped conductive powder FD2, or any one of the first sized spherical conductive powder SD1, the second sized spherical conductive powder SD2 and the third sized spherical conductive powder SD3; and any one of the first SiO$_2$-SrCO$_3$-BaCO$_3$-Li$_2$SO$_4$-K$_2$SO$_4$-based glass frit SKi, the second SiO$_2$-SrCO$_3$-BaCO$_3$-Li$_2$SO$_4$-K$_2$SO$_4$-based glass frit SK2, the third SiO$_2$-SrCO$_3$-BaCO$_3$-Li$_2$SO$_4$-K$_2$SO$_4$-based glass frit SK3, and the fourth SiO$_2$-SrCO$_3$-BaCO$_3$-Li$_2$SO$_4$-K$_2$SO$_4$-based glass frit SK4 for the first glass frit, or any one of the first BaCO$_3$-SiO$_2$-SrCO$_3$-CaF-based glass frit BC1, the second BaCO$_3$-SiO$_2$-SrCO$_3$-CaF-based glass frit BC2, the third BaCO$_3$-SiO$_2$-SrCO$_3$-CaF-based glass frit BC3, the fourth BaCOs-SiO$_2$-SrCOs-CaF-based glass frit BC4, and the fifth BaCOs-SiO$_2$-SrCOs-CaF-based glass frit BC5 for the second glass frit. In other words, the conductive base materials of Comparative Examples 1 to 17 were prepared in such a way to have powder sizes D$_{50}$ regulated by selectively using either one of the first sized spherical conductive powder SD1 or the second sized spherical conductive powder SD2, or any one of the first sized spherical conductive powder SD1, the second sized spherical conductive powder SD2 and the third sized spherical conductive powder SD3.

The specific components of the first glass frit given in Table 1 are presented in Table 2.

TABLE 2

|  | SK1 | SK2 | SK3 | SK4 |
| --- | --- | --- | --- | --- |
| SiO$_2$ (wt %) | 20 | 28 | 30 | 40 |
| SrCO$_3$ (wt %) | 17 | 15 | 16 | 15 |
| BaCO$_3$ (wt %) | 20 | 20 | 19 | 18 |
| Li$_2$CO$_3$ (wt %) | 9 | 8 | 7 | 7 |
| K$_2$CO$_3$ (wt %) | 9 | 7 | 8 | 7 |
| V$_2$O$_5$ (wt %) | 10 | 8 | 8 | 7 |
| ZnO (wt %) | 8 | 10 | 8 | 4 |
| Al$_2$O$_3$ (wt %) | 4 | 1 | 4 | 2 |
| Y$_2$O$_3$ (wt %) | 3 | 3 | 0 | 0 |

The first glass frit was prepared, as presented in Table 2, using the first to fourth SiO$_2$-SrCO$_3$-BaCO$_3$-Li$_2$SO$_4$-K$_2$SO$_4$-based glass frits SKi, SK2, SK3, and SK4.

The first SiO$_2$-SrCO$_3$-BaCO$_3$-Li$_2$SO$_4$-K$_2$SO$_4$-based glass frit SKI of the first glass frit was prepared using20 wt. % of SiO$_2$, 17 wt. % of SrCOs, 20 wt. % of BaCOs, 9 wt. % of Li$_2$SO$_4$, 9 wt. % of K$_2$SO$_4$, 10 wt. % of V205, 8 wt. % of Zn0, 4 wt. % of Al$_2$O$_3$, and 3 wt. % of Y$_2$O$_3$ to have a powder size D$_{50}$ of 0.3 µm, a glass transition temperature T$_g$ of 420° C. and a glass softening point T$_s$ of 460° C. In the first SiO$_2$-SrCO$_3$-BaCO$_3$-Li$_2$SO$_4$-K$_2$SO$_4$-based glass frit SKi, V$_2$O$_5$ and ZnO were used as transition metals, and $Al_2O_3$ and $Y_2O_3$ were used as anti-oxidation agents to prevent penetration of the plating solution through improved acid resistance.

The second $SiO_2$-$SrCO_3$-$BaCO_3$-$Li_2SO_4$-$K_2SO_4$-based glass fr it SK2 was prepared using 28 wt. % of $SiO_2$, 15 wt. % of SrCOs, 20 wt. % of BaCOs, 8 wt. % of $Li_2SO_4$, 7 wt. % of $K_2SO_4$, 8 wt. % of $V2O_5$, 10 wt. % of Zn0, 1 wt. % of $Al_2O_3$, and 3 wt. % of $Y_2O_3$ to have a powder size $D_{50}$ of 0.9 µm, a glass transition temperature $T_g$ of 420° C. and a glass softening point $T_s$ of 460° C. In the second $SiO_2$-$SrCO_3$-$BaCO_3$-$Li_2SO_4$-$K_2SO_4$-based glass frit SK2, $V_2O_5$ and ZnO were used as transition metals, and $Al_2O_3$ and $Y_2O_3$ were used as anti-oxidation agents to prevent penetration of the plating solution through improved acid resistance.

The third $SiO_2$-$SrCO_3$-$BaCO_3$-$Li_2SO_4$-$K_2SO_4$-based glass frit SK3 was prepared using 30 wt. % of $SiO_2$, 16 wt. % of SrCOs, 19 wt. % of BaCOs, 7 wt. % of $Li_2SO_4$, 8 wt. % of $K_2SO_4$, 8 wt. % of $V_2O5$, 8 wt. % of ZnO, and 4 wt. % of $Al_2O_3$ to have a powder size $D_{50}$ of 1.2 urm, a glass transition temperature $T_g$ of 450° C. and a glass softening point $T_s$ of 480° C. In the third $SiO_2$-$SrCO_3$-$BaCO_3$-$Li_2SO_4$-$K_2SO_4$-based glass frit SK3, $V_2O_5$ and ZnO were used as transition metals, and $Al_2O_3$ was used as an anti-oxidation agent to prevent penetration of the plating solution through improved acid resistance.

The fourth $SiO_2$-$SrCO_3$-$BaCO_3$-$Li_2SO_4$-$K_2SO_4$-based glass frit SK4 was prepared using 40 wt. % of $SiO_2$, 15 wt. % of $SrCO_3$, 18 wt. % of $BaCO_3$, 7 wt. % of $Li_2SO_4$, 7 wt. % of $K_2SO_4$, 7 wt. % of $V_2O_5$, 4 wt. % of ZnO, and 2 wt. % of $Al_2O_3$ to have a powder size $D_{50}$ of 1.5 urm, a glass transition temperature $T_g$ of 450° C. and a glass softening point $T_s$ of 480° C. In the fourth $SiO_2$-$SrCO_3$-$BaCO_3$-$Li_2SO_4$-$K_2SO_4$-based glass frit SK4, $V_2O_5$ and ZnO were used as transition metals, and $Al_2O_3$ was used as an anti-oxidation agent to prevent penetration of the plating solution through improved acid resistance.

The specific components of the second glass frit given in Table 1 are presented in Table 3.

TABLE 3

|  | BC1 | BC2 | BC3 | BC4 | BC5 |
|---|---|---|---|---|---|
| BaCO (wt %) | 40 | 45 | 48 | 51 | 56 |
| SrCO$_3$ (wt %) | 9 | 8 | 8 | 7 | 7 |
| SiO$_2$ (wt %) | 9 | 9 | 8 | 7 | 7 |
| CaF (wt %) | 10 | 10 | 10 | 8 | 8 |
| ZnO (wt %) | 23 | 22 | 21 | 20 | 20 |
| Al$_2$O$_3$ (wt %) | 5 | 4 | 5 | 4 | 2 |
| La$_2$O$_3$ (wt %) | 2 | 0 | 0 | 2 | 0 |
| Y$_2$O$_3$ (wt %) | 2 | 2 | 0 | 1 | 0 |

The second glass frit was prepared, as presented in Table 3, using the first to fifth BaCOs-$SiO_2$-SrCOs-CaF-based glass frits BC1, BC2, BC3, BC4, and BC5.

The first $BaCO_3$-$SiO_2$-$SrCO_3$-CaF-based glass frit BC1 of the second glass frit was prepared using 40 wt. % of $BaCO_3$, 9 wt. % of $SiO_2$, 9 wt. % of $SrCO_3$, 10 wt. % of CaF, 23 wt. % of ZnO, 5 wt. % of $Al_2O_3$, 2 wt. % of $La_2O_3$, and 2 wt. % of $Y_2O_3$ to have a powder size $D_{50}$ of 2.0 µm, a glass transition temperature $T_g$ of 520° C. and a glass softening point $T_s$ of 540° C. In the first $BaCO_3$-$SiO_2$-$SrCO_3$-CaF-based glass frit BC1, ZnO was used as a transition metal, and $Al_2O_3$, $La_2O_3$ and $Y_2O_3$ were used as anti-oxidation agents to prevent penetration of the plating solution through improved acid resistance.

The second $BaCO_3$-$SiO_2$-$SrCO_3$-CaF-based glass frit BC2 was prepared using 45 wt. % of $BaCO_3$, 9 wt. % of $SiO_2$, 8 wt. % of $SrCO_3$, 10 wt. % of CaF, 22 wt. % of ZnO, 4 wt. % of $Al_2O_3$, and 2 wt. % of $Y_2O_3$ to have a powder size $D_{50}$ of 2.5 µm, a glass transition temperature $T_g$ of 520° C. and a glass softening point $T_s$ of 540° C. In the second $BaCO_3$-$SiO_2$-$SrCO_3$-CaF-based glass frit BC2, ZnO was used as a transition metal, and $Al_2O_3$ and $Y_2O_3$ were used as anti-oxidation agents, to prevent penetration of the plating solution through improved acid resistance.

The third $BaCO_3$-$SiO_2$-$SrCO_3$-CaF-based glass frit BC3 was prepared using 48 wt. % of $BaCO_3$, 8 wt. % of $SiO_2$, 8 wt. % of $SrCO_3$, 10 wt. % of CaF, 21 wt. % of ZnO, and 5 wt. % of $Al_2O_3$ to have a powder size $D_{50}$ of 3.0 µm, a glass transition temperature $T_g$ of 535° C. and a glass softening point $T_s$ of 560° C. In the third $BaCO_3$-$SiO_2$-$SrCO_3$-CaF-based glass frit BC3, ZnO was used as a transition metal, and $Al_2O_3$ was used as an anti-oxidation agent to prevent penetration of the plating solution through improved acid resistance.

The fourth $BaCO_3$-$SiO_2$-$SrCO_3$-CaF-based glass frit BC4 was prepared using 51 wt. % of $BaCO_3$, 7 wt. % of $SiO_2$, 7 wt. % of $SrCO_3$, 8 wt. % of CaF, 20 wt. % of ZnO, 4 wt. % of $Al_2O_3$, 2 wt. % of $La_2O_3$, and 1 wt. % of $Y_2O_3$ to have a powder size $D_{50}$ of 3.5 µm, a glass transition temperature $T_g$ of 535° C. and a glass softening point $T_s$ of 560° C. In the fourth $BaCO_3$-$SiO_2$-$SrCO_3$-CaF-based glass frit BC4, ZnO was used as a transition metal, and $Al_2O_3$, $L_{a2}O_3$ and $Y_2O_3$ were used as anti-oxidation agents to prevent penetration of the plating solution through improved acid resistance.

The fifth $BaCO_3$-$SiO_2$-$SrCO_3$-CaF-based glass frit BC5 was prepared using 56 wt. % of $BaCO_3$, 7 wt. % of $SiO_2$, 7 wt. % of $SrCO_3$, 8 wt. % of CaF, 20 wt. % of ZnO, and 2 wt. % of $Al_2O_3$ to have a powder size $D_{50}$ of 4.0 µm, a glass transition temperature $T_g$ of 535° C. and a glass softening point $T_s$ of 560° C. In the fifth $BaCO_3$-$SiO_2$-$SrCO_3$-CaF-based glass frit BC5, ZnO was used as a transition metal, and $Al_2O_3$ was used as an anti-oxidation agent, to prevent penetration of the plating solution through improved acid resistance.

The first and second glass frits as used herein have a powder size $D_{50}$ of 0.1 to 4.0 µm. Accordingly, an increase in the surface energy according to the powder size $D_{50}$ has no significant effect on the glass transition temperature, and the dispersed first or second glass frit softens at its softening point and diffuses into the flake-shaped conductive powder or the spherical conductive powder. The space where the first or second glass frit has escaped is left as a void. The void becomes smaller with a decrease in the powder size $D_{50}$ of the first or second glass frit. The smaller void improves the density of the conductive layer 21 (shown in FIG. 1) of the external electrode 20 (in FIG. 1).

Further, the first or second glass frit is of a small powder size $D_{50}$. This allows the first or second glass frit to be evenly dispersed in the conductive paste. At the softening point, the dispersed first or second glass frit diffuses into the flake-shaped or spherical conductive powder due to capillary action, so the flake-shaped or spherical conductive powder can be uniformly melted throughout the conductive layer 21 of the external electrode 20. In the case of the flake-shaped or spherical conductive powder formed of copper (Cu), such a uniform melt of the flake-shaped or spherical conductive powder makes the copper (Cu) atoms diffused rapidly, allowing sintering and densification faster than solid state sintering. Thus, the use of the first or second glass frit of a small powder size $D_{50}$ can realize the densification of the conductive layer 21 at low temperatures, so the results shown in Table 4 can be obtained in Examples 1 to 11.

In another embodiment of the first and second glass frits, the first glass frit had a powder size $D_{50}$ of 2.0 to 4.0 μm, and the second glass frit had a powder size $D_{50}$ of 0.3 to 1.5 μm, to improve the sintering temperature. The powder size $D_{50}$ of the first glass frit was, for example, 2.0 μm for the first $SiO_2$-$SrCO_3$-$BaCO_3$-$Li_2SO_4$-$K_2SO_4$-based glass frit SK1; 2.8 μm for the second $SiO_2$-$SrCO_3$-$BaCO_3$-$Li_2SO_4$-$K_2SO_4$-based glass frit SK2; 3.2 μm for the third $SiO_2$-$SrCO_3$-$BaCO_3$-$Li_2SO_4$-$K_2SO_4$-based glass frit SK3; and 4.0 μm for the fourth $SiO_2$-$SrCO_3$-$BaCO_3$-$Li_2SO_4$-$K_2SO_4$-based glass frit SK4. The powder size $D_{50}$ of the second glass frit was, for example, 0.3 μm for the first $BaCO_3$-$SiO_2$-$SrCO_3$-CaF-based glass frit BC1; 0.6 μm for the second $BaCO_3$-$SiO_2$-$SrCO_3$-CaF-based glass frit BC2; 0.9 μm for the third $BaCO_3$-$SiO_2$-$SrCO_3$-CaF-based glass frit BC3; 1.2 μm for the fourth $BaCO_3$-$SiO_2$-$SrCO_3$-CaF-based glass frit BC4; and 1.5 μm for the fifth $BaCO_3$-$SiO_2$-$SrCO_3$-CaF-based glass frit BC5.

A multilayer ceramic capacitor shown in FIG. 1 was manufactured in order to test the conductive paste compositions for external electrode according to Comparative Examples 1 to 17 and Examples 1 to 11 described in Table 1. In the manufacture of the multilayer ceramic capacitor, BaTiOs powder and additive powder were mixed, followed by pulverization and calcination at 600 to 1,200° C. to create a dielectric slurry. The additive powder was a combination of at least seven selected from MgO, $Mn_3O_4$, $Cr_2O_3$, $Al_2O_3$, $CaCO_3$, $ZrO_2$, $Y_2O_3$, $Dy_2O_3$, and $Yb_2O_3$. The rare earth glass frit was formed using rare earth oxides in addition to a glass frit. The glass frit was formed of BaO, CaO, and $SiO_2$, and the rare earth oxides were a combination of at least two selected from $Y_2O_3$, $Dy_2O_3$, and $Yb_2O_3$. The dielectric slurry was spread on a carrier film (not shown) and dried to form a ceramic green sheet having a thickness of 0.9 μm. A screen mask was used to imprint a conductive paste for internal electrode on the ceramic green sheet to form internal electrode layers 11 formed of nickel (Ni). After formation of the internal electrode layers 11 with nickel, multiple ceramic green sheets were layered so that the internal electrode layers crossed each other. Pressure was applied through isostatic pressing under the pressure conditions of 800 to 1,300 kgf/cm² at 85° C. to form a green chip (not shown). The green chip compressed under the pressure of 800 to 1,300 kgf/cm² was cut into individual chips. The cut chips were maintained at about 230° C. under atmospheric conditions for about 60 hours to remove the binder. Each chip removed of the binder was sintered (fired) at a temperature of 1,160 to 1,260° C. under reducing atmosphere and re-oxidized by heat treatment at 800 to 1,000° C. under nitrogen ($N_2$) atmosphere to form a sintered chip 10. The chip size of the sintered chip 10 was about 1.0 mm×0.5 mm (1005 size) (length×width).

After completion of the sintered chips, each of the conductive paste compositions for external electrode according to Comparative Examples 1 to 17 and Examples 1 to 11 was prepared and used in a termination process to provide a conductive layer 21, fol lowedby sintering electrodes. Then, a plating process was conducted to form a nickel (Ni) layer 22 and a tin (Sn) layer 22 on the conductive layer 21, completing an external electrode 20. The plating process employs a published technique, and a description thereof will be omitted.

The conductive paste compositions for external electrode according to Comparative Examples 1 to 17 and Examples 1 to 11 described in Table 1 was prepared as conductive pastes by mixing an organic solvent, a binder resin, and a dispersing agent in a conductive base material. The conductive pastes according to Comparative Examples 1 to 17 and Examples 1 to 5 were prepared by mixing 70 wt. % of the conductive base material, 15 wt. % of the organic solvent, 10 wt. % of the binder resin, and 5 wt. % of the dispersing agent; and those according to Examples 6 to 11 were prepared by mixing 81 wt. % of the conductive base material, 10 wt. % of the organic solvent, 6 wt. % of the binder resin, and 3 wt. % of the dispersing agent. In the preparation of the conductive pastes, the conductive base material was the same as described previously; the organic solvent was dihydroterpineol; the binder resin was methyl methacrylate; and the dispersing agent was oleoyl sarcosine. The conductive base material, the organic solvent, the binder resin, and the dispersing agent were mixed together and then dispersed with a three-roll mill. In this regard, the binder resin was acryl resin (polybutylmethacrylate) and polyamine amide (MW:800, Acid value: 40 mgKOH/g).

The conductive pastes had a viscosity (measurement instrument and conditions:Brookfield HVDV-2T, SC4-14 Spindle, at 25° C.) of 23 to 38 Pa·S at 10 rpm and 26.5 to 32 Pa·S at 100 rpm. Upon completion of the conductive paste using the conductive base material, a dipping method was employed to form a conductive layer 21 of an external electrode 20 on the sintered body, followed by a firing cycle in an oven (not shown) at 100 to 200° C. The conductive layer 21 was prepared as many as needed in the manufacture of Comparative Examples 1 to 17 and Examples 1 to 11 described in Tables 1, 2 and 3.At least, the multilayer ceramic capacitors were fabricated as many as the number of Comparative Examples 1 to 17 and Examples 1 to 11 described in Table 1.

The individual multilayer ceramic capacitors with the conductive layer 21 of the external electrode 20 prepared according to Comparative Examples 1 to 17 and Examples 1 to 11 described in Tables 1 to 3 were inspected (1005 size, capacitance 10 μF) and tested. The testing results are presented in Table 4.

TABLE 4

|  | Capacitance (CT) | ESR (ET) | Cracking (KT) | Reliability (RT) | Solder Defects (BT) | Spattering (ST) |
| --- | --- | --- | --- | --- | --- | --- |
| Comparative Example 1 | X | 96 | 0/100 | ○ | 0/1000 | X |
| Comparative Example 2 | ○ | 0 | 3/100 | X | 0/1000 | ○ |
| Comparative Example 3 | ○ | 0 | 4/100 | ○ | 0/1000 | ○ |
| Comparative Example 4 | X | 0 | 0/100 | ○ | 0/1000 | X |
| Comparative Example 5 | ○ | 0 | 0/100 | X | 0/1000 | ○ |

TABLE 4-continued

|  | Capacitance (CT) | ESR (ET) | Cracking (KT) | Reliability (RT) | Solder Defects (BT) | Spattering (ST) |
|---|---|---|---|---|---|---|
| Comparative Example 6 | ○ | 0 | 0/100 | X | 0/1000 | ○ |
| Comparative Example 7 | X | 0 | 0/100 | ○ | 0/1000 | X |
| Comparative Example 8 | X | 0 | 0/100 | ○ | 0/1000 | X |
| Comparative Example 9 | ○ | 66 | 0/100 | ○ | 2/1000 | ○ |
| Comparative Example 10 | ○ | 0 | 0/100 | ○ | 4/1000 | ○ |
| Comparative Example 11 | ○ | 0 | 0/100 | X | 0/1000 | ○ |
| Comparative Example 12 | ○ | 0 | 0/100 | ○ | 0/1000 | ○ |
| Comparative Example 13 | X | 0 | 0/100 | ○ | 0/1000 | X |
| Comparative Example 14 | X | 0 | 0/100 | ○ | 0/1000 | X |
| Comparative Example 15 | X | 64 | 0/100 | ○ | 0/1000 | X |
| Comparative Example 16 | X | 0 | 0/100 | ○ | 0/1000 | X |
| Comparative Example 17 | X | 0 | 0/100 | ○ | 0/1000 | X |
| Example 1 | ○ | 0 | 0/100 | ○ | 0/1000 | ○ |
| Example 2 | ○ | 0 | 0/100 | ○ | 0/1000 | ○ |
| Example 3 | ○ | 0 | 0/100 | ○ | 0/1000 | ○ |
| Example 4 | ○ | 0 | 0/100 | ○ | 0/1000 | ○ |
| Example 5 | ○ | 0 | 0/100 | ○ | 0/1000 | ○ |
| Example 6 | ○ | 0 | 0/100 | ○ | 0/1000 | ○ |
| Example 7 | ○ | 0 | 0/100 | ○ | 0/1000 | ○ |
| Example 8 | ○ | 0 | 0/100 | ○ | 0/1000 | ○ |
| Example 9 | ○ | 0 | 0/100 | ○ | 0/1000 | ○ |
| Example 10 | ○ | 0 | 0/100 | ○ | 0/1000 | ○ |
| Example 11 | ○ | 0 | 0/100 | ○ | 0/1000 | ○ |

Table 4 presents the testing results for the multilayer ceramic capacitors prepared to have a 1005 size and a capacitance of 10 IF and include a conductive layer 21 formed of the conductive base materials according to Comparative Examples 1 to 17 and Examples 1 to 11 in a capacitance test (CT), an equivalent series resistance (ESR) test (ET), a high-temperature high-humidity reliability test (RT), a test (KT) checking for the presence of cracks in the bonding interface between external electrode 20 and internal electrode layer 11, a test (BT) checking for the presence of solder defects, and a spattering test (ST) checking for the presence of solder ball spattering.

The capacitance test (CT) involved determining if each of the multilayer ceramic capacitors having the conductive layer 21 formed of the conductive base material according to Comparative Examples 1 to 17 and Examples 1 to 11 afforded the specified capacitance of 10 μF. That is, it was determined if the capacitance measurement was satisfactory for the specified capacitance, 10 μF. The capacitance was measured using an LCR meter. The capacitor was considered acceptable (good, "0") if its capacitance measurement was at least 95% of the specified capacitance; whereas, the capacitor was considered unacceptable (poor, "×") if its capacitance measurement was below 95% of the specified capacitance.

The ESR test (ET) involved using an LCR meter to measure the ESR (Equivalent Series Resistance) of each multilayer ceramic capacitor having the conductive layer 21 formed of the conductive base material according to Comparative Examples 1 to 17 and Examples 1 to 11. The capacitor was considered acceptable (good, "0") if its ESR measurement was satisfactory for a specified ESR; whereas the capacitor was considered unacceptable (poor, "0") if its ESR measurement was not satisfactory for the specified ESR. Here, the specified ESR was 0.01 to 1 MQ.

The crack check test (KT) checking for the presence of cracks was carried out on 100 of each multilayer ceramic capacitor having the conductive layer 21 formed of the conductive base material according to Comparative Examples 1 to 17 and Examples 1 to 11. The test method involved exposing the bonding interface between the external electrode 20 and the internal electrode layer 11 and inspecting the exposed bonding interface with an optical microscope to determine the number of capacitors with cracks per 100 of each multilayer ceramic capacitor prepared according to Comparative Examples 1 to 17 and Examples 1 to 11.

The high-temperature high-humidity reliability test (RT) was to perform a moisture resistance test under the conditions of 95% humidity and 125° C. for 72 hours of test runtime with a rated voltage applied. After the RT test, it was determined if the insulation resistance dropped or not. In the high-temperature high-humidity reliability test (RT), the multilayer ceramic capacitor was considered acceptable (good, "0") if its insulation resistance was $1.0 \times 106Q$ or above; whereas, the capacitor was considered unacceptable (poor, "×") if its insulation resistance was below $1.0 \times 106$ Q.

The solder defect test (BT) checking for the presence of solder defects was performed on 100 of each multilayer ceramic capacitor according to Comparative Examples 1 to 17 and Examples 1 to 11. For the test (BT), surface mounting equipment (not shown) was used to mount 100 of each multilayer ceramic capacitor according to Comparative Examples 1 to 17 and Examples 1 to 11 on a printed circuit board (not shown). Then, the mounted state was visually inspected with a microscope to determine the number of the incorrectly mounted capacitors per 100 of each multilayer ceramic capacitor.

The spattering test (ST) checking for the presence of solder ball spattering was also performed on 100 of each multilayer ceramic capacitor according to Comparative Examples 1 to 17 and Examples 1 to 11. For the test (ST), surface mounting equipment (not shown) was used to mount 100 of each multilayer ceramic capacitor according to Comparative Examples 1 to 17 and Examples 1 to 11 on a printed circuit board (not shown). Then, the mounted state was visually inspected with a microscope to determine the presence or absence of solder ball spattering defects on 100 of each multilayer ceramic capacitor.

The ceramic capacitor was considered acceptable (good, "0") if no solder ball spattering defect was found; whereas, the capacitor was considered unacceptable (poor, "×") if there were any solder ball spattering defect.

According to the results of the capacitance test (CT), equivalent series resistance (ESR) test (ET), high-temperature high-humidity reliability test (RT), crack check test (KT), solder defect test (BT), and spattering test (ST), as presented in Table 4, some of the multilayer ceramic capacitors according to Comparative Examples 1 to 17 were considered unacceptable("×") in the capacitance test (CT), ESR test (ET), high-temperature high-humidity reliability test (RT), or solder ball spattering test (ST); and some of the capacitors were considered unacceptable ("×") in the crack check test (KT) or solder defect test (BT). In contrast, all the multilayer ceramic capacitors according to Examples 1 to 11 were considered acceptable ("0") in the capacitance test (CT), ESR test (ET), high-temperature high-humidity reliability test (RT), and solder ball spattering test (ST), and found to have neither cracks nor solder defects in the crack check test (KT) and solder defect test (BT).

The conductive base materials according to Comparative Examples 1 to 17 as given in Table 3 used the flake-shaped conductive powder or the spherical conductive powder alone, or a combination of either one of the first sized flake-shaped conductive powder FD1 or the second sized flake-shaped conductive powder FD2 and one of the first sized spherical conductive powder SD1, the second sized spherical conductive powder SD2, and the third sized spherical conductive powder SD3. In this case, the conductive layer 21 (shown in FIG. 1) of the external electrode 20 (in FIG. 1) could not be densely formed, and shrinkage occurred uncontrollably during the sintering process of the green chips and the external electrode 20, causing a risk of cracks or appearance defects. With cracks or appearance defects, the multilayer ceramic capacitors prepared according to Comparative Examples 1 to 17 were considered unacceptable ("×") in the capacitance test (CT), ESR test (ET), high-temperature high-humidity reliability test (RT), and solder ball spattering test (ST) and found to be defective in the crack check test (KT) and solder defect test (BT).

The conductive base materials according to Examples 1 to 11 as specified in Table 3 used all of the spherical conductive powders, i.e., the first sized spherical conductive powder SD1, the second sized spherical conductive powder SD2, and the third sized spherical conductive powder SD3, along with the two flake-shaped conductive powder, i.e., the first sized flake-shaped conductive powder FD1 and the second sized flake-shaped conductive powder FD2. By using the flake-shaped conductive powders in combination with the spherical conductive powders, the conductive layer 21 of the external electrode 20 (shown in FIG. 1) could be densely formed, and shrinkage was well controllable during the sintering process of the green chips and the external electrode 20. This made it possible to prevent a risk of cracks or appearance defects. Further, the conductive base materials according to Examples 1 to 11 were prepared using 8 to 38 wt. % of the first sized flake-shaped conductive powder FD1, 16 to 20 wt. % of the second sized flake-shaped conductive powder FD2, 8 to 14 wt. % of the first sized spherical conductive powder SD1, 20 to 28 wt. % of the second sized spherical conductive powder SD2, and 14 to 20 wt. % of the third sized spherical conductive powder SD3. This improved the electric conductivity of the external electrode 20 and prevented a risk of deteriorating workability and adhesion to the sintered body 10 due to the relatively low content of the other components than the conductive metal powders. In consequence, the multilayer ceramic capacitors with the conductive layer 21 of the external electrode 20 formed of the conductive base materials according to Examples 1 to 11 as presented in Table 3 were all considered acceptable ("0") in the capacitance test (CT), the ESR test (ET), the high-temperature high-humidity reliability test (RT), and the solder ball spattering test (ST), and found to have neither cracks nor solder defects in the crack check test (KT) and the solder defect test (BT).

As described above, the conductive base materials according to Comparative Examples 1 to 17 as presented in Table 3 were prepared using either any one of the first $SiO_2$-$SrCO_3$-$BaCO_3$-$Li_2SO_4$-$K_2SO_4$-based glass frit SKi, the second $SiO_2$-$SrCO_3$-$BaCO_3$-$Li_2SO_4$-$K_2SO_4$-based glass frit SK2, the third $SiO_2$-$SrCO_3$-$BaCO_3$-$Li_2SO_4$-$K_2SO_4$-based glass frit SK3, and the fourth $SiO_2$-$SrCO_3$—$BaCO_3$-$Li_2SO_4$-$K_2SO_4$-based glass frit SK4 for the first glass frit, or any one of the first $BaCO_3$-$SiO_2$-$SrCO_3$-CaF-based glass frit BC1, the second $BaCO_3$-$SiO_2$-$SrCO_3$-CaF-based glass frit BC2, the third $BaCO_3$-$SiO_2$-$SrCO_3$-CaF-based glass frit BC3, the fourth BaCOs-$SiO_2$-SrCOs—CaF-based glass frit BC4, and the fifth BaCOs—$SiO_2$-SrCOs—CaF-based glass frit BC5 for the second glass frit. That is, Comparative Examples 1 to 17 used a selected conductive base material alone.

By using a conductive base material alone, as shown in Table 4, cracks occurred or the plating solution penetrated during the plating process due to deteriorated acid resistance, reducing the reliability or leading to unsuccessful formation of a responsive layer (not shown) to the sintered body 10, to deteriorate adhesion or capacitance.

As presented in Table 3, the conductive base materials according to Examples 1 to 11 of the present invention used a combination of the first and second glass frits as well. That is, the conductive base materials according to Examples 1 to 11 of the present invention used any one of the first $SiO_2$-$SrCO_3$—$BaCO_3$-$Li_2SO_4$-$K_2SO_4$-based glass frit SKi, the second $SiO_2$-$SrCO_3$—$BaCO_3$-$Li_2SO_4$-$K_2SO_4$-based glass frit SK2, the third $SiO_2$-$SrCO_3$-$BaCO_3$-$Li_2SO_4$-$K_2SO_4$-based glass frit SK3, and the fourth $SiO_2$-$SrCO_3$—$BaCO_3$-$Li_2SO_4$-$K_2SO_4$-based glass frit SK4 for the first glass frit and any one of the first $BaCO_3$-$SiO_2$-$SrCO_3$-CaF-based glass frit BC1, the second $BaCO_3$-$SiO_2$-$SrCO_3$-CaF-based glass frit BC2, the third $BaCO_3$-$SiO_2$-$SrCO_3$-CaF-based glass frit BC3, the fourth BaCOs-$SiO_2$-SrCOs—CaF-based glass frit BC4, and the fifth BaCOs—$SiO_2$-SrCOs—CaF-based glass frit BC5 for the second glass frit, to solve the problems with Comparative Examples 1 to 17.

As presented in Table 3, the conductive base materials according to Examples 1 to 11 of the present invention further used 1 to 4 wt. % of the first glass frit and 3 to 6 wt. % of the second glass frit, so they could contain 4 wt. % to 10 wt. % of the first or second glass frit. By using 4 to 10 wt. % of the first or second glass frit, it was possible to prevent a deterioration in the adhesion between the sintered body and the external electrode formed of the conductive paste composition that might occur if the content of the first or second glass frit were below 1 wt. %, and occurrence of plating defects resulting from the overflow of the first or second glass frit that might be found if the content of the first or second glass frit were above 15 wt. %.

As described above, the conductive paste composition for an external electrode of a multilayer ceramic capacitor according to the present invention includes a flake-shaped conductive powder and a spherical conductive powder having different shapes and sizes, two different types of glass frits, i.e., first and second glass frits, and anti-oxidation agents, i.e., $Al_2O_3$, $Y_2O_3$, and $L_2O_3$, added to the first and second glass frits, so it can increase the density of the conductive layer 21 of the external electrode 20, improve shrinkage and contact properties, enhance the oxidation resistance as an action of the anti-oxidation agents, and improve the shrinkage and adhesion of the conductive layer 21, thereby preventing the penetration of the plating solution. Thus, the conductive paste composition for an external electrode of a multilayer ceramic capacitor according to the present invention improves the density and adhesion of the conductive layer 21 of the external electrode 20 to prevent penetration of the plating solution and secures its applicability to high capacitance by adopting sintering at low temperatures, which prevents deterioration of reliability associated with mechanical strengths or moisture resistance through occurrence of cracks, which is normally caused when using Cu for the flake-shaped conductive powders and spherical conductive powders and Ni for the internal electrode layer 11 in such a manner that Cu particles diffuse throughout the internal electrode layer 11 due to formation of an alloy by the reaction between Cu and Ni of the internal electrode and the difference in diffusion rate between Cu and Ni to expand the volume of the internal electrode layer and thereby increase the stress in a dielectric substance, leading to cracks.

What is claimed is:

1. A conductive paste composition for an external electrode of a multilayer ceramic capacitor, comprising a conductive base material, an organic solvent, a binder resin, and a dispersing agent,
    wherein the conductive base material comprises a flake-shaped conductive powder, a spherical conductive powder, and first and second glass frits,
    wherein the flake-shaped conductive powder has a larger size ($D_{50}$) than the spherical conductive powder,
    wherein the first glass frit comprises $SiO_2$, $SrCO_3$, $BaCO_3$, $Li_2SO_4$, $K_2SO_4$, $V_2O_5$, $ZnO$, $Al_2O_3$, and $Y_2O_3$,
    wherein the second glass frit comprises $SiO_2$, $SrCO_3$, $BaCO_3$, $CaF$, $ZnO$, $Al_2O_3$, $Y_2O_3$, and $L_2O_3$.

2. The conductive paste composition according to claim 1, wherein the flake-shaped conductive powder and the spherical conductive powder are formed of Cu,
    wherein the flake-shaped conductive powder has a size ($D_{50}$) of 2.0 to 4.0 μm, the spherical conductive powder having a size ($D_{50}$) of 0.3 to 1.5 μm.

3. The conductive paste composition according to claim 1, wherein the conductive base material comprises 14 to 68 wt. % of the flake-shaped conductive powder, 28 to 74 wt. % of the spherical conductive powder, 1 to 4 wt. % of the first glass frit, and 3 to 8 wt. % of the second glass frit.

4. The conductive paste composition according to claim 1, wherein the first glass frit comprises 20 to 40 wt. % of $SiO_2$, 15 to 17 wt. % of $SrCO_3$, 18 to 20 wt. % of $BaCO_3$, 7 to 9 wt. % of $Li_2SO_4$, 7 to 9 wt. % of $K_2SO_4$, 7 to 10 wt. % of $V_2O_5$, 4 to 8 wt. % of $ZnO$, 2 to 4 wt. % of $Al_2O_3$, and 0 to 3 wt. % of $Y_2O_3$, wherein the second glass frit comprises 40 to 56 wt. % of $BaCO_3$, 7 to 9 wt. % of $SiO_2$, 7 to 9 wt. % of $SrCO_3$, 8 to 10 wt. % of $CaF$, 20 to 23 wt. % of $ZnO$, 2 to 5 wt. % of $Al_2O_3$, 0 to 2 wt. % of $L_2O_3$, and 0 to 2 wt. % of $Y_2O_3$.

5. The conductive paste composition according to claim 1, wherein the first glass frit has a smaller powder size ($D_{50}$) than the second glass frit,
    wherein the first glass frit has a powder size ($D_{50}$) of 0.3 to 1.5 μm, the second glass frit having a powder size ($D_{50}$) of 2 to 4.0 μm.

6. The conductive paste composition according to claim 1, wherein the organic solvent includes anyone selected from the group consisting of carbitol, terpineol, hexyl carbitol, taxanol, butyl carbitol, butyl carbitol acetate, dimethyl adipate, dihydroterpinyl actate, and isobornyl acetate,
    wherein the binder resin includes at least one selected from the group consisting of tyrene-(meth)acrylic acid ester copolymer, acrylic acid-butyl acrylate copolymer, and methyl methacrylate,
    wherein the dispersing agent includes at least one selected from the group consisting of carboxylic acid, stearic acid, oleic acid, and oleoyl sarcosine.

7. The conductive paste composition according to claim 1, wherein the conductive paste composition is prepared by mixing 70 to 81 wt. % of the conductive base material, 10 to 15 wt. % of the organic solvent, 6 to 10 wt. % of the binder resin, and 3 to 5 wt. % of the dispersing agent.

8. A conductive paste composition for an external electrode of a multilayer ceramic capacitor, comprising a conductive base material, an organic solvent, a binder resin, and a dispersing agent,
    wherein the conductive base material comprises 8 to 38 wt. % of a first sized flake-shaped conductive powder, 16 to 20 wt. % of a second sized flake-shaped conductive powder, 8 to 14 wt. % of a first sized spherical conductive powder, 20 to 28 wt. % of a second sized spherical conductive powder, 14 to 20 wt. % of a third sized spherical conductive powder, 1 to 4 wt. % of a first glass frit, and 3 to 6 wt. % of a second glass frit,
    wherein the first sized flake-shaped conductive powder, the second sized flake-shaped conductive powder, the first sized spherical conductive powder, the second sized spherical conductive powder, and the third sized spherical conductive powder have different sizes ($D_{50}$),
    wherein the first glass frit includes any one selected from the group consisting of a first $SiO_2$-$SrCOs$-$BaCO_3$-$Li_2SO_4$-$K_2SO_4$-based glass frit, a second $SiO_2$-$SrCO_3$-$BaCO_3$-$Li_2SO_4$-$K_2SO_4$-based glass frit, a third $SiO_2$-$SrCO_3$-$BaCO_3$-$Li_2SO_4$-$K_2SO_4$-based glass frit, and a fourth $SiO_2$-$SrCO_3$-$BaCO_3$-$Li2SO_4$-$K_2SO_4$-based glass frit,
    wherein the second glass frit includes any one selected from the group consisting of a first $BaCO_3$-$SiO_2$-$SrCO_3$-$CaF$-based glass frit, a second $BaCO_3$-$SiO_2$-$SrCO_3$-$CaF$-based glass frit, a third $BaCO_3$-$SiO_2$-$SrCO_3$-$CaF$-based glass frit, a fourth $BaCO_3$-$SiO_2$-$SrCO_3$-$CaF$-based glass frit, and a fifth $BaCO_3$-$SiO_2$-$SrCO_3$-$CaF$-based glass frit.

9. The conductive paste composition according to claim 8, wherein the first sized flake-shaped conductive powder has a smaller size ($D_{50}$) than the second sized flake-shaped conductive powder,
- the second sized flake-shaped conductive powder having a smaller size ($D_{50}$) than the third sized spherical conductive powder,
- the first sized spherical conductive powder having a smaller size ($D_{50}$) than the second sized spherical conductive powder,
- the second sized spherical conductive powder having a smaller size ($D_{50}$) than the third sized spherical conductive powder,
- the third sized spherical conductive powder having a smaller size ($D_{50}$) than the first sized flake-shaped conductive powder.

10. The conductive paste composition according to claim 8, wherein each of the first, second, third, and fourth $SiO_2$-$SrCO_3$-$BaCO_3$-$Li_2SO_4$-$K_2SO_4$-based glass frits comprises at least eight selected from the group consisting of $SiO_2$, $SrCO_3$, $BaCO_3$, $Li_2SO_4$, $K_2SO_4$, $V_2O_5$, ZnO, $Al_2O_3$, and $Y_2O_3$,
- wherein each of the first, second, third, fourth, and fifth $BaCO_3$-$SiO_2$-$SrCO_3$-CaF-based glass frits comprises at least six selected from the group consisting of $BaCO_3$, $SiO_2$, $SrCO_3$, CaF, ZnO, $Al_2O_3$, $Y_2O_3$, and $L_2O_3$.

11. The conductive paste composition according to claim 8, wherein the first, second, third, and fourth $SiO_2$-$SrCO_3$-$BaCO_3$-$Li_2SO_4$-$K_2SO_4$-based glass frits have different powder sizes ($D_{50}$),
- wherein the first, second, third, fourth, and fifth $BaCO_3$-$SiO_2$-$SrCO_3$-CaF-based glass frits have different powder sizes ($D_{50}$),
- wherein the first, second, third, fourth, and fifth $BaCO_3$-$SiO_2$-$SrCO_3$-CaF-based glass frits have larger powder sizes ($D_{50}$) than the first, second, third, and fourth $SiO_2$-$SrCO_3$-$BaCO_3$-$Li_2SO_4$-$K_2SO_4$-based glass frits.

* * * * *